US010795671B2

(12) United States Patent
Aggarwal et al.

(10) Patent No.: US 10,795,671 B2
(45) Date of Patent: Oct. 6, 2020

(54) AUDIOVISUAL SOURCE CODE DOCUMENTATION

(71) Applicant: INTERNATIONAL BUSINESS MACHINES CORPORATION, Armonk, NY (US)

(72) Inventors: Aniya Aggarwal, New Delhi (IN); Danish Contractor, Gurgaon (IN); Varun Parashar, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/818,932

(22) Filed: Nov. 21, 2017

(65) Prior Publication Data

US 2019/0155600 A1 May 23, 2019

(51) Int. Cl.
  *G06F 9/44* (2018.01)
  *G06F 8/73* (2018.01)
  *G06F 8/34* (2018.01)
  *G06F 11/36* (2006.01)
  *G06F 8/30* (2018.01)

(52) U.S. Cl.
  CPC .................. *G06F 8/73* (2013.01); *G06F 8/30* (2013.01); *G06F 8/34* (2013.01); *G06F 11/3664* (2013.01)

(58) Field of Classification Search
  CPC ........................................................ G06F 8/73
  USPC ........................................................ 717/123
  See application file for complete search history.

(56) References Cited

U.S. PATENT DOCUMENTS

| 6,795,806 B1 * | 9/2004 | Lewis ..................... G06F 3/167 704/260 |
| 6,993,487 B2 * | 1/2006 | Bluvband ................. G06F 8/73 704/251 |
| 7,099,798 B2 | 8/2006 | Yu et al. |
| 8,464,209 B2 * | 6/2013 | Marius ................... G06Q 10/06 717/105 |
| 9,250,703 B2 * | 2/2016 | Hernandez-Abrego ..................... G10L 15/26 |

(Continued)

OTHER PUBLICATIONS

Kevic et al., "Tracing Software Developers' Eyes and Interactions for Change Tasks", FSE, Aug. 30-Sep. 4, 2015, ACM, pp. 1-12.

(Continued)

*Primary Examiner* — Evral E Bodden
(74) *Attorney, Agent, or Firm* — John H. Noh

(57) ABSTRACT

Audiovisual documentation of source code in an integrated development environment. A computing device initiates a knowledge transfer session for discussion of source code and generation of audiovisual source code documentation explaining segments of source code from a code base. An audiovisual interface containing a segment of code from the code base is displayed within the integrated development environment. Audio during the knowledge transfer session is recorded with a recording device. Code tracking indicators from an optical tracking device operated by a user are received when the user is reviewing and focused on the segment of code. The computing device determines via the code tracking indicators a module of the segment of code under review. Portions of the recorded audio are associated with the determined module of the segment of code to generate audiovisual source code documentation. The knowledge transfer session is terminated.

20 Claims, 7 Drawing Sheets

(56) References Cited

U.S. PATENT DOCUMENTS

| | | | |
|---|---|---|---|
| 2007/0288889 A1* | 12/2007 | Harrison | G06F 8/73 |
| | | | 717/110 |
| 2009/0006448 A1 | 1/2009 | Pall et al. | |
| 2011/0321008 A1* | 12/2011 | Jhoney | G06F 8/38 |
| | | | 717/114 |
| 2013/0013206 A1 | 1/2013 | Guha et al. | |
| 2014/0002352 A1 | 1/2014 | Jacob et al. | |
| 2015/0243288 A1* | 8/2015 | Katsuranis | G06F 3/0484 |
| | | | 704/275 |
| 2015/0370772 A1* | 12/2015 | Wang | G06F 17/241 |
| | | | 715/230 |
| 2017/0017732 A1 | 1/2017 | Hamann et al. | |
| 2017/0262360 A1* | 9/2017 | Kochura | G06F 11/3688 |

OTHER PUBLICATIONS

Shaffer et al., "iTrace: Enabling Eye Tracking on Software Artifacts within the IDE to Support Software Engineering Tasks", FSE Aug. 30-Sep. 4, 2015, Bergamo, Italy, ACM, pp. 1-4.

Ping et al., "Selection and Presentation Practices for Code Example Summarization", Copyright 2014 ACM 978-1-4503-3056, pp. 1-12.

Mell et al., "The NIST Definition of Cloud Computing", National Institute of Standards and Technology, Special Publication 800-145, Sep. 2011, pp. 1-7.

* cited by examiner

AUDIOVISUAL SOURCE CODE DOCUMENTATION

BACKGROUND

The present invention relates generally to the field of integrated development environments, and more particularly to audiovisual documentation of source code within integrated development environments.

BRIEF SUMMARY

Embodiments of the present invention disclose a method, computer program product, and computer system for audiovisually documenting source code in an integrated development environment. A computing device associated with a first terminal initiates a knowledge transfer session for discussion of source code, and generation of audiovisual source code documentation explaining segments of source code from a code base. An audiovisual interface containing a segment of code from the code base is displayed within an integrated development environment executing on the first terminal. Audio during the knowledge transfer session is recorded with a recording device. Code tracking indicators are received from an optical tracking device operated by a user at the first terminal when the user is reviewing and focused on the segment of code. The computing device determines via the code tracking indicators a module of the segment of code under review. Portions of the recorded audio are associated with the determined module of the segment of code to generate audiovisual source code documentation. The knowledge transfer session is terminated.

DETAILED DESCRIPTION

Figure 1:
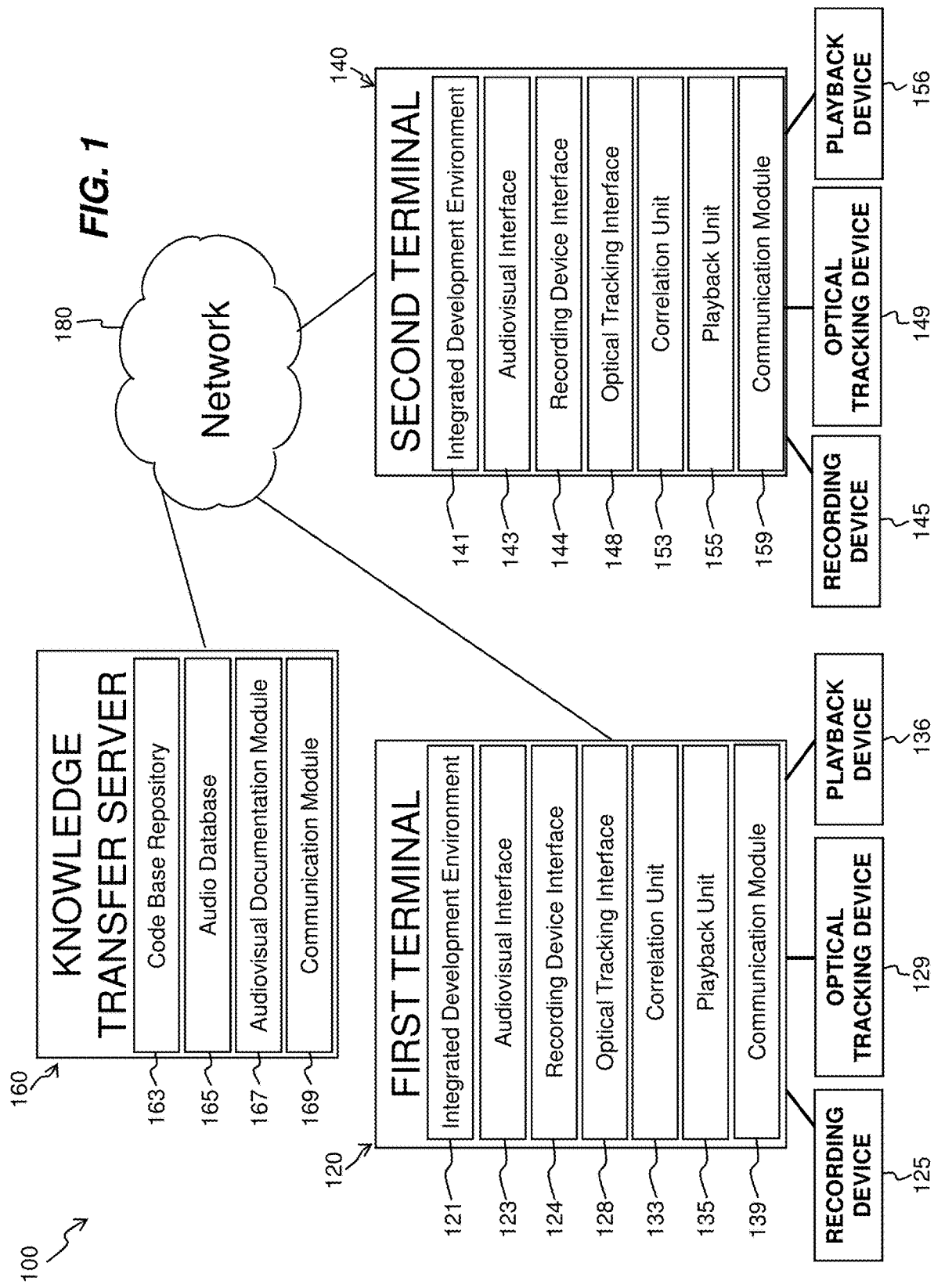
FIG. 1 is a functional block diagram illustrating an environment for audiovisual source code documentation, in accordance with an embodiment of the present invention.

When presented with a large code base developed by another, developers and other individuals who need to review and understand the code base may be presented with a very difficult task that is potentially very time-consuming and tedious, depending upon the complexity of the code base. Traditional source code documentation (such as Javadoc™) includes written text and diagrams that accompanies a code base or is integrated within a code base to aid in understanding of the code base, even if detailed and thorough, still may be lengthy to review in its entirety as well as incomplete in describing all the functions of the code base. It may be possible to speak with the original developers of the code base, to have them explain the code base in an efficient manner, but frequently the original developers are busy themselves and not available for a discussion, thus leaving only the traditional documentation available. Presented is a method, system, and computer program product to audiovisually document source code within an integrated development environment.

Audiovisual source code documentation, as used herein, refers to recorded verbal discussions of specific sections or modules of source code available for playback by future users of the presently disclosed invention to facilitate understanding of source code. Audiovisual source code documentation is generated from verbal descriptions given by a user explaining the source code or verbal discussions between multiple users regarding source code.

A "recording device" as used herein, refers to any device for recording of audio, including any sort of microphone, or the equivalent.

An "optical tracking device" as used herein refers to any device or process for tracking and determining where the eyes of a user are pointing or gazing at any given time, such that that the tracking information is recorded for later use. By means of non-limiting example, specialized headgear having infrared or laser pointers indicating where the head of the user is pointing, reflections of infrared light on the user's eyes, and specialized contact lenses may be utilized to perform this function. All tracking information After-arising equivalents are specifically contemplated. An eye gaze tracking algorithm may be involved in the tracking of the user's eyes. Any optical tracking device as used herein serves to determine where the eyes of user are pointing at any given time, specifically for the purpose herein of determining which section, module, or line or source code a user is reviewing at any given time, or determining whether the user is looking away from a computer screen where the source code is displayed.

In various embodiments of the invention, during description of source code from a single user or discussions between multiple users regarding source code, optical tracking devices are worn by user or users, the optical tracking devices indicating which section or module of the source code is being reviewed by the user or users at any given time. The presently disclosed invention then, as further discussed herein, associates portions of the recorded audio with the sections or modules being reviewed by the user or users at any given time to generate audiovisual source code documentation. The audiovisual source code documentation generated by the presently disclosed invention discusses specific sections or modules of source code to aid in their understanding of the source code, alongside or in place of traditional source code documentation.

FIG. 1 is a functional block diagram illustrating an environment 100 for audiovisual source code documentation, in accordance with an embodiment of the invention. In an exemplary embodiment, a first terminal 120 and, in certain embodiments, a second terminal 140 display to respective users of each terminal 120, 140 source code of a code base for discussion and generation of audiovisual source code documentation. Recording device 125 records a verbal description from or conversation with a user associated with the first terminal 120. The verbal description or conversation is regarding the displayed source code, but may also include discussion of other topics, such as the news, sports, or other business news. Optical tracking device 129 (or alternative means of tracking and recording which portion of code the user is reviewing at any time) is attached to the head of user of the first terminal 120, and tracks and records which portion of code the user of the first terminal 120 is reviewing at any given time during the description or conversation, while removing discussions of other topics. Alternative means of determining which portion of code the user of the first terminal 120 is reviewing are specifically contemplated herein. After audiovisual source code documentation has been created, the playback device 136 plays back the audiovisual source code documentation upon request of the user of the first terminal 120 (or another terminal, as appropriate). Second terminal 140, when present, has similar hardware to first terminal 120, including recording device 145 and optical tracking device 149, allowing the presently disclosed invention to track which portion of code a second user is viewing at any given time, and allowing for the generation of audiovisual source code documentation from discussions between two users, as further discussed.

During the description or discussions, optical tracking devices are worn by user or users, the optical tracking devices indicating which section or module of the source code is being reviewed by the user or users at any given time. The presently disclosed invention then, as further discussed herein, associates portions of the recorded audio with the sections or modules being reviewed by the user or users at any given time to generate audiovisual source code documentation. The audiovisual source code documentation generated by the presently disclosed invention discusses specific sections or modules of source code to aid in their understanding of the source code, alongside or in place of traditional source code documentation.

Knowledge transfer server 160 performs various functions to facilitate the creation and viewing of audiovisual source code documentation, including storing versions of the code base (and associated traditional source code documentation, if any), storing audio discussions regarding the code base recorded by recording device 125 or recording device 145 before the audio discussions have been turned into audiovisual source code, storing generated audiovisual source code documentation, storing which sections or modules of source code are prominent, etc., as further discussed below. First terminal 120, second terminal 140, and knowledge transfer server 160 are connected via a network 180. In various embodiments, network 180 represents, for example, an internet, a local area network (LAN), a wide area network (WAN) such as the Internet, and includes wired, wireless, or fiber optic connections. In general, network 180 may be any combination of connections and protocols that will support communications between first terminal 120, second terminal 140, and knowledge transfer server 160, in accordance with an embodiment of the invention.

In various embodiments, first terminal 120, second terminal 140, and knowledge transfer server 160 may be, for example, a mainframe or a mini computer, a terminal, a laptop, a tablet, a netbook personal computer, a mobile device, a desktop computer, or any other sort of computing device, in accordance with embodiments described herein. First terminal 120, second terminal 140, and knowledge transfer server 160 may include internal and external hardware components as depicted and described further in detail with reference to FIG. 4 below. In other embodiments, each of first terminal 120, second terminal 140, and knowledge transfer server 160 may be implemented in a cloud computing environment, as described in relation to FIGS. 5 and 6, below. In a still further embodiment, some or all of first terminal 120, second terminal 140, and knowledge transfer server 160 are embodied in physically the same computing device, with all communications between various components internally.

First terminal 120, second terminal 140, and knowledge transfer server 160, in effect, represent any sort of computing device possessing sufficient processing power to execute software to be utilized in audiovisual source code documentation. Computing devices associated with first terminal 120, second terminal 140, and knowledge transfer server 160 may, as utilized in the course of the presently disclosed invention, utilize a hosted workload 96 as displayed in connection with FIG. 6 below, and/or perform other tasks as further described herein.

In the exemplary embodiment, first terminal 120 includes an integrated development environment 121, an audiovisual interface 123, a recording device interface 124, an optical tracking interface 128, a correlation unit 133, a playback unit 135, and a communication module 139. As discussed previously, the first terminal 120 is also operatively connected to a recording device 125, an optical tracking device 129, and a playback device 136.

Figure 4:
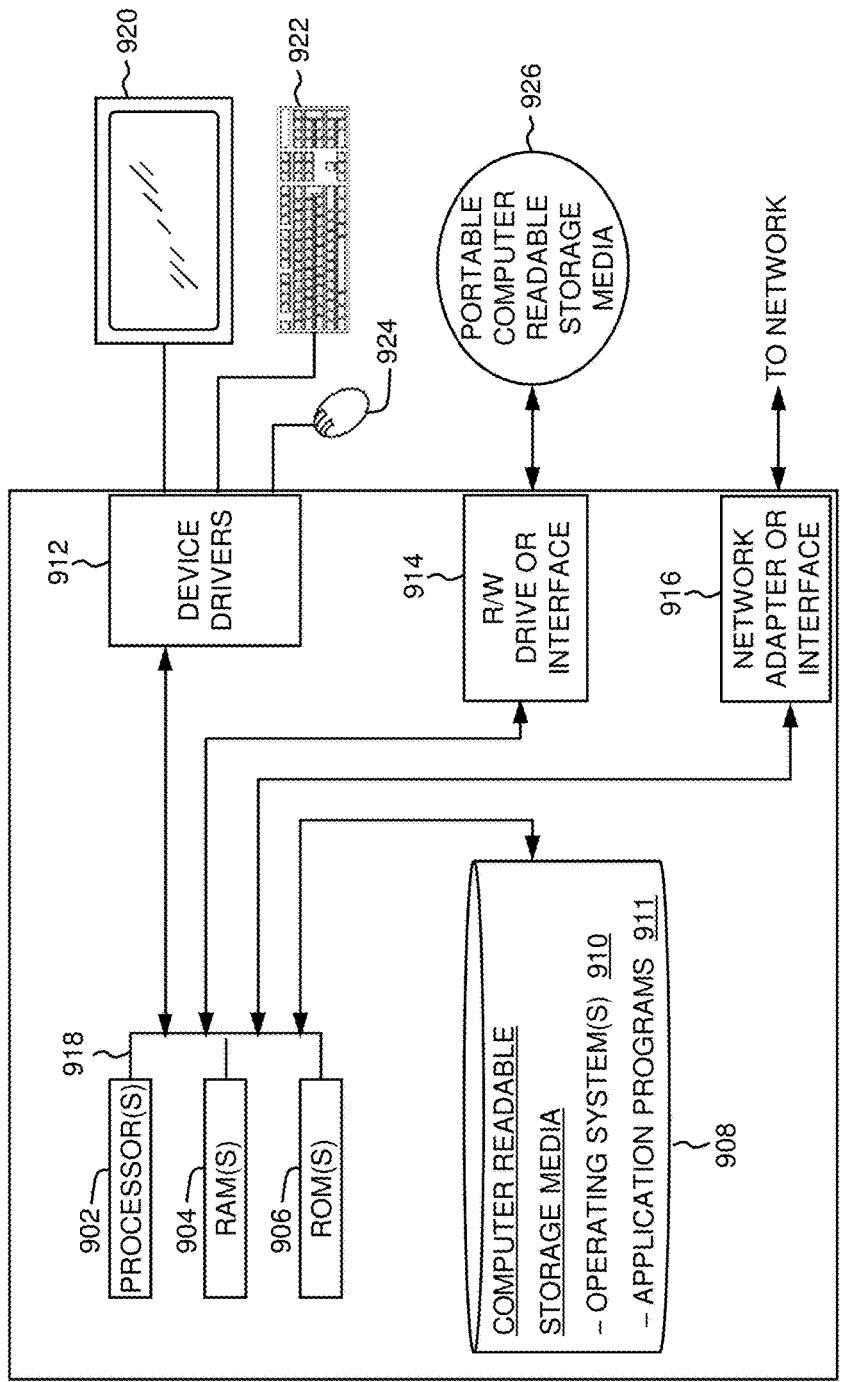
FIG. 4 depicts a block diagram of components of first terminal, second terminal, and knowledge transfer server of FIG. 1, in accordance with an embodiment of the present invention.

Integrated development environment 121 represents software executing on first terminal 120 allowing the user of the first terminal 120 to access, write, edit, compile or interpret, check-in or and check-out source code of a code base. Integrated development environment 121 herein may be operated singly by a user of first terminal 120, allowing the user of the first terminal 120 to edit source code while recording a knowledge transfer session, or, in alternative embodiments, make available source code to the user of first terminal 120 and simultaneously make available source code to a user of second terminal 140, allowing the users to discuss and/or collectively edit source code during a knowledge transfer session. The integrated development environment 121 may, for example, be visible in a display screen 920 such as shown in FIG. 4, with a keyboard or keypad 922 and/or a computer mouse or touchpad 924 allowing the user of the first terminal 120 access and edit the code base.

Audiovisual interface 123 represents software installed or executing on first terminal 120 to present source code to user of the first terminal 120. The source code has previously been checked-out by the integrated development environment 121. A segment of code may be visible at any one time in the audiovisual interface 123, of a total code base available to first terminal 120. The segment of code visible in the audiovisual interface 123 may change, via the segment of code self-scrolling within the audiovisual interface 123, or the user scrolling through the source code at his or her own pace. In the present invention, the user of first terminal 120 may explain the segment of code visible at any one time, with the audiovisual interface 123 in conjunction with the recording device interface 124 and recording device 125 recording the explanation, used further as discussed below in generation of audiovisual source code documentation, as further discussed below, recording the discussion, for further use. Alternatively, the user of the first terminal 120 may discuss the segment of code visible at any one time with the user of the second terminal 140, while the audiovisual interface 123 in conjunction with other elements discussed recording the discussion. The audiovisual interface 123 may be implemented as a plug-in to the integrated development environment 121, replace relevant portions of the integrated development environment 121, or operate in conjunction with the integrated development environment 121. The audiovisual interface 123 also serves, in conjunction with other functionality described herein, to initiate a knowledge transfer session, as further discussed herein. The audiovisual interface 123 also terminates the knowledge transfer session when appropriate.

Figure 2:
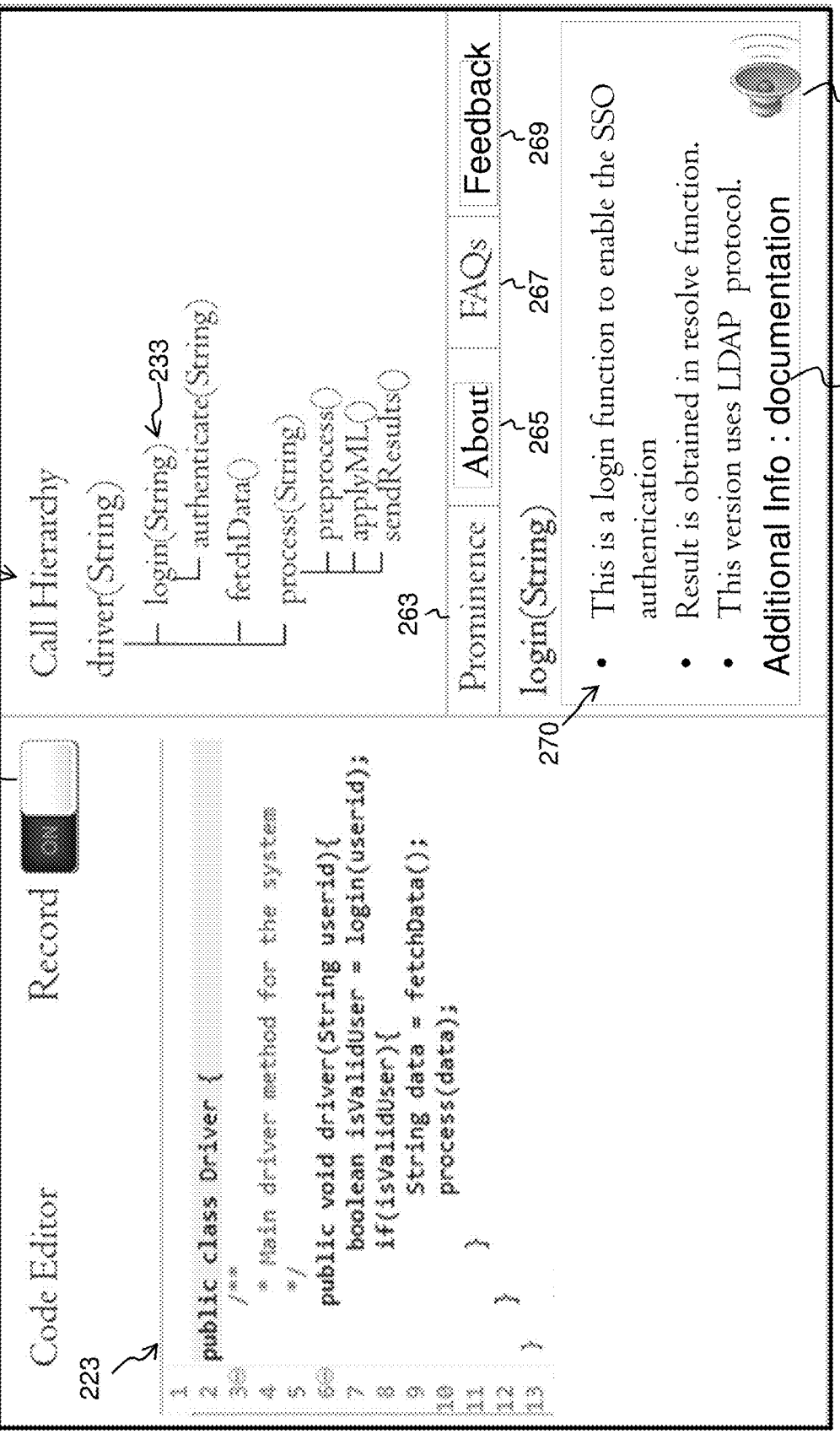
FIG. 2 is a screenshot of an audiovisual interface, in accordance with an embodiment of the present invention.

The audiovisual interface 123 also provides various information regarding the segment of code displayed at any one time, as discussed further in connection with FIG. 2. The audiovisual interface 123, for example, may display whether a particular segment of code displayed or module of code displayed is prominent or not, based upon information provided by the correlation unit 133.

Recording device interface 124 represents hardware and/or software on the first terminal 120 for interfacing and receiving recorded audio from the recording device 125. The recording device 125, after receipt from the recording device 125, records the user of the first terminal 120 speaking during knowledge transfer sessions. The recorded audio, for example, includes explanations from the user or discussions between users during knowledge transfer sessions are further used as discussed herein. The knowledge transfer session may by one user of the first terminal 120 explaining the segment of code visible in the audiovisual interface 123, or may be between the user of the first terminal 120 and the user of the second terminal 140 discussing the segment of code visible in the audiovisual interface 123. In either case, the recording device interface 124 records the explanations from the single user of first terminal 120 or the discussions between the user of the first terminal 120 and the second terminal 140 from the point of view of the user of the first terminal 120. The recording device interface 124 may also record off-topic discussions not related to the source code, which as further discussed herein are removed in the generation of audiovisual source code documentation.

Optical tracking interface 128 represents hardware and/or software on the first terminal 120 for interfacing with the optical tracking device 129 and determining where the eyes of the user are pointing or gazing, specifically which segment, module or line of code the user is viewing at any time in audiovisual interface 123, or whether the user is not focused on any source code at all. In the preferred embodiment, the optical tracking device 129 is specialized headgear which utilizes, in conjunction with receiver hardware associated with first terminal 120, infrared signals to determine which segment, module, or line of code the user of first terminal 120 is viewing at any one time. The optical tracking device 129 may also rely upon alternative technical means for determining which segment, module, or line of code the user of first terminal 120 is viewing, as discussed above. When the optical tracking device 129 indicates the user is pointing or gazing at a segment, module, or line of code, the optical tracking interface 128 sends code tracking indicators to the audiovisual interface 123 indicating the specific segment, module, or line of code being viewed (of all code displayed in audiovisual interface 123). If a specific segment or line of code is being reviewed by user of first terminal 120, the code tracking indicators are then utilized to determine which module of the segment of code is under review, for further use as discussed below. The code tracking indicators may be screen coordinates of a screen coordinate system, which the audiovisual interface 123 utilizes to determine the module of the segment of code under review by utilizing the screen coordinates to determine a line number or line numbers of code under review. The audiovisual interface 123 of computing device then utilizes the line number or line numbers to determine, with the integrated development environment 121, the module of the segment of code under review.

When the optical tracking device 129 indicates the user is not pointing or gazing at any segment of code appearing in audiovisual interface 123, the optical tracking device 129 sends off-code tracking indicators to the audiovisual interface 123 indicating so, with the off-code tracking indicators further utilized as disclosed herein.

The correlation unit 133 receives the code tracking indicators sent to the audiovisual interface 123. The correlation unit 133 then associates portions of the recorded audio recorded by the recording device 125 with the code tracking indicators sent at a given time. This serves to correlate the portions of the recorded audio with the module of the segment in the code under review, and the audiovisual source code documentation for that module is thus created. After the correlation is made, the audiovisual source code documentation may facilitate understanding of the source code. The correlation unit 133 may extract and store questions and answers from the audio stored by the recording device 125 between the first terminal 120 and second terminal 140. After extracting and storing the questions and answers, the correlation unit 133 associates each question and answer with the module of the segment of code under review. This correlation is also used as audiovisual source code documentation. When generating audiovisual source code documentation, the correlation unit 133 may utilize natural language processing to remove from recordings any discussion not regarding source code, in order to streamline generation of audiovisual source code documentation.

The correlation unit 133 also receives off-code tracking indicators from the optical tracking unit 129 via the optical tracking interface 128. The off-code tracking indicators indicate that the optical tracking unit 129 is not focused on any segment, line, or module of source code at all. In such circumstances, the correlation unit 133 determines a start time of off-code tracking (i.e. when the optical tracking unit 129 begins being not focused on any segment of code, as if the user is looking away from the audiovisual interface 123), and an end time of off-code tracking (i.e. when the optical tracking unit 129 begins focusing again on the segment of code in the audiovisual interface 123). The correlation unit 133 then analyzes recorded audio recorded by the recording device 125 between the start time of off-code tracking and the end-time of off-code tracking, and determines modules discussed in the recorded audio during this time as well as removes discussions irrelevant to source code. The associated portions of the recorded audio between the start time of off-code tracking and the end time of off-code tracking are then associated with the determined modules.

Data collected by the correlation unit 133 when aggregated may be utilized to determine whether lines, sections, or modules of source code are to be flagged as "prominent" for further use as discussed herein. Code study patterns indicated by user at user terminal 120 and collected by correlation unit 133 may be used in the determination of whether lines, sections, or modules of source code are to be flagged as "prominent," based upon tracking indicators received from the optical tracking device 129. A line, section, or module flagged as prominent is viewed by the optical tracking device 129 relatively more (e.g. >10%) than a less important line, section, or module is viewed by the optical tracking device 129. Alternatively, if a line, section, or module is more frequently discussed in verbal descriptions or conversations recorded by the recording device interface 124, the correlation unit 133 may flag the line, section, or module as "prominent."

The playback unit 135 represents software for playing back audiovisual source code documentation upon request from the user of first terminal 120. The audiovisual source code documentation, after creation (as discussed above), remains available to aid in understanding the source code. A user seeking to understand a section, line, or module of source code, may click on the section, line, or module of source code and be presented with the audiovisual source code documentation regarding that section, line, or module.

The communication module 139 represents hardware and/or software for communications between first terminal 120 and second terminal 140, as well as communication between first terminal 120 and knowledge transfer server 160.

The second terminal 140, when present in environment 100, includes an integrated development environment 141, an audiovisual interface 143, a recording device interface 144, an optical tracking interface 148, a correlation unit 153, a playback unit 155, and a communication module 159. The second terminal 140 is utilized in situations where a knowledge transfer session is recorded between a user at first terminal 120, and user at second terminal 140 when generating audiovisual source code documentation, in situations when user at second terminal 140 is interested in playing back previously generated audiovisual source code documentation, as previously discussed, and in other situations. Integrated development environment 141, audiovisual interface 143, recording device interface 144, optical tracking interface 148, correlation unit 153, playback unit 155, and communication module 159 perform the same function as integrated development environment 121, audiovisual interface 123, recording device interface 124, optical tracking interface 128, correlation unit 133, playback unit 135, and communication module 139, respectively.

Knowledge transfer server 160 includes a code base repository 163, audio database 165, audiovisual documentation module 167, and a communication module 169.

Code base repository 163 represents software installed on knowledge transfer server 160 for storing a code base. The code base is a complete collection of source code for compiling (or interpreting) an application, software, software component, etc. Code base repository 163 may also hold all traditional source code documentation for understanding of the code base, including written text, images, etc. Integrated development environment 121 and/or integrated development environment 141 may check-out source code from code base repository 163 for review and editing, as needed. All source code stored by the code base repository 163 may be stored in an encrypted or unencrypted form. The code base, as used herein, may be understood to comprise discrete "modules," which may be objects, classes, interfaces, methods, subroutines, etc., with each module providing discrete functionality in terms of the code base.

Audio database 165 represents software installed on knowledge transfer server 160 for storing recorded audio recorded by the recording device 125 and recording device interface 124 of first terminal 120 and/or the recording device 145 and recording device interface 144 during a knowledge transfer session. The audio is from explanations or conversations from users associated with the first terminal 120 and/or second terminal 140.

Audiovisual documentation module 167 represents software installed on knowledge transfer server 160 for storing correlated portions of the recorded audio with discrete modules of segments of code as audiovisual source code documentation. As discussed elsewhere herein, after portions of recorded audio have been correlated with the modules of the segment of code under review (and, possibly, superfluous elements removed), the recorded audio is available for later use by users who desire to understand modules of source code in an expedited fashion. The audiovisual source code documentation is available for playback by the playback unit 135 or the playback unit 155, or by other terminals (not shown here), as further discussed herein.

Audiovisual documentation module 167 also maintains information regarding various lines, modules or segments of source code available in the code base repository 163 which are flagged as prominent, based upon data collected from correlation unit(s) 133, 153. This information regarding lines, modules, or segments of source code which are flagged as prominent is available in the audiovisual interface 123 of first terminal 120 or the audiovisual interface 143 of second terminal 140.

Communication module 169 represents hardware and/or software for communications between the knowledge transfer server 160 and the first terminal 120 and the knowledge transfer server 160 and the second terminal 140.

FIG. 2 is screenshot of an audiovisual interface 123, in accordance with an embodiment of the invention. The audiovisual interface 223 is executing on a terminal (not shown). The audiovisual interface 223 displays a module of source code, as seen. The user of the terminal may elect to turn on or turn off recording during a knowledge transfer session, via record control element 225. When recording is turned on, the recording device associated with the terminal records audio from the user associated with the terminal. The call hierarchy for the module is displayed 229. The module of the segment of code under review is displayed 233, specifically "login." Various information regarding the login module is also available to be selected by the user, including the prominence of the module 263 (such as whether or not the module 263 is more intensely scrutinized or not, as discussed above), basic information about the module 265, frequently asked questions regarding the module 267, and feedback regarding the module 269. About the module has been selected 265, and information regarding the module is displayed 270. Traditional documentation is available via selection of hyperlink 271. Playback of previously generated audiovisual source code documentation is available via 275.

Figure 3A:
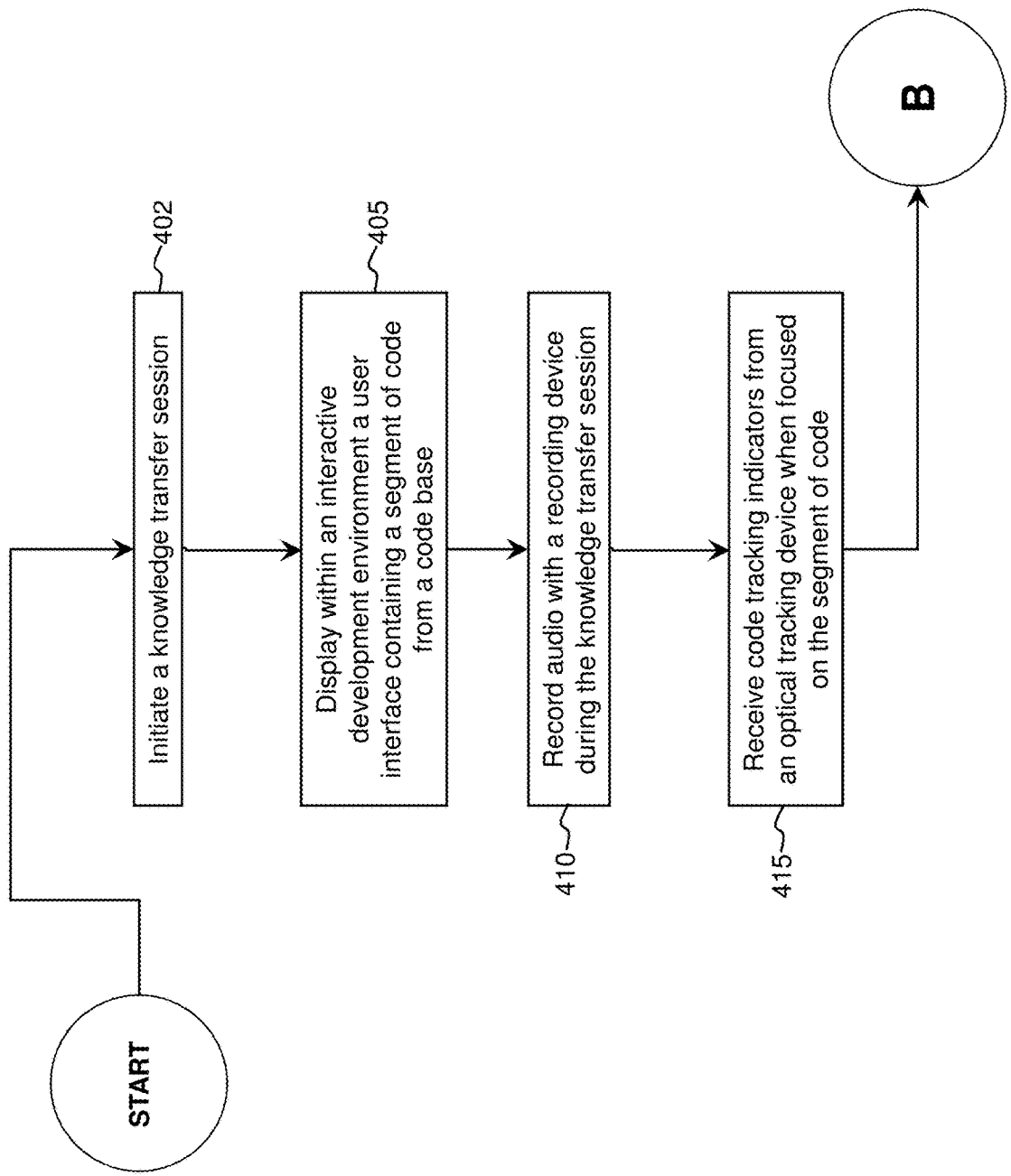
FIGS. 3A and 3B are a flowchart depicting operational steps that a hardware component of a hardware appliance may execute, in accordance with an embodiment of the invention.
Figure 3B:
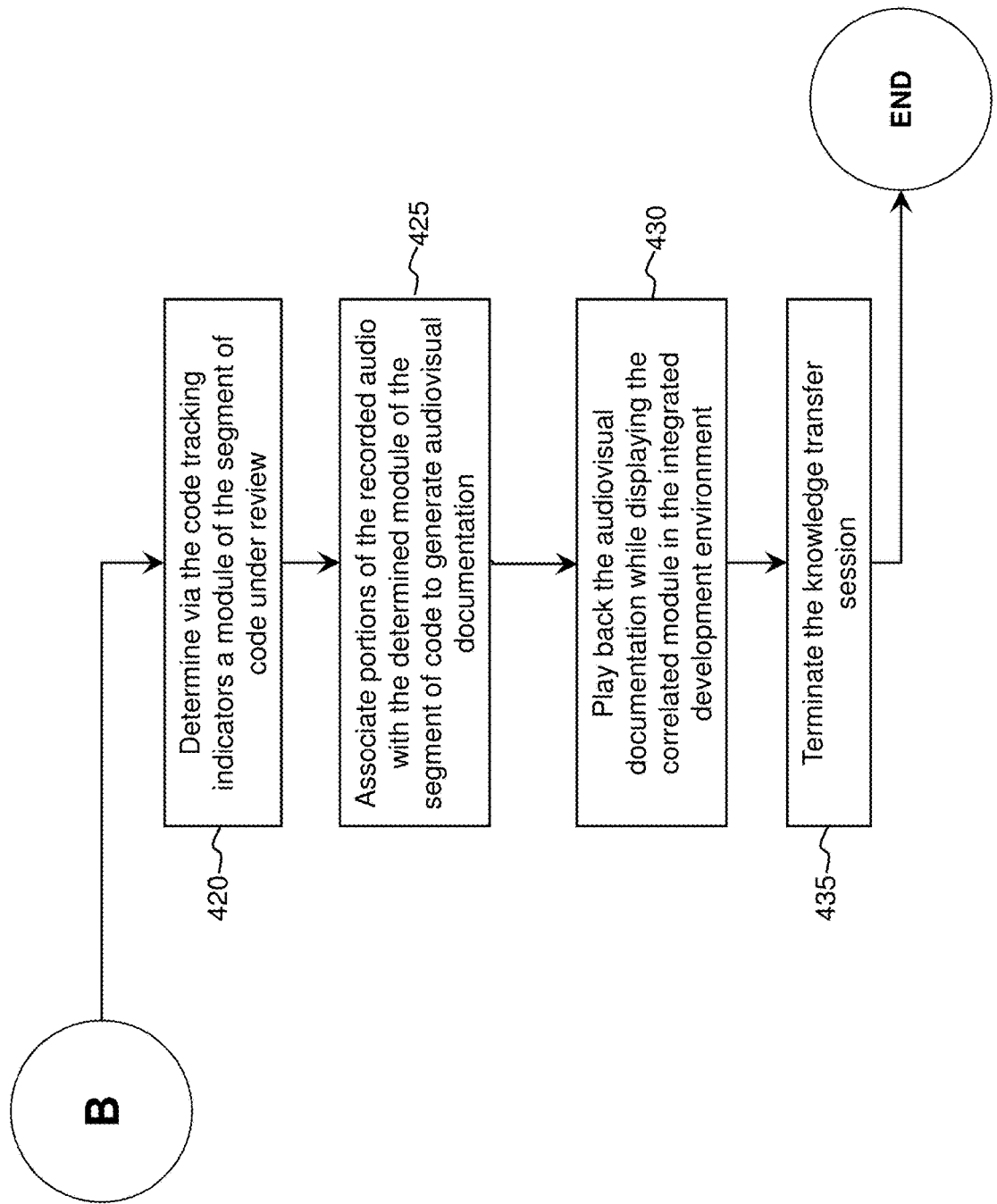

FIGS. 3A and 3B are a flowchart depicting operational steps that a hardware component, multiple hardware components, and/or a hardware appliance may execute, in accordance with an embodiment of the invention. As shown in FIG. 3A, at step 402 a knowledge transfer session is initiated by a computing device associated with first terminal 120 for discussion of source code and generation of audiovisual source code documentation explaining segments of source code from a code base. At step 405, an interactive development environment 121 is displayed in first terminal 120 by audiovisual interface 123, the audiovisual interface 123 containing a segment of code from a code base. The code base was previously checked-out from code base repository 163 in knowledge transfer server 160 by the interactive development environment 121. At step 410, audio from the user associated with the first terminal 120 is recorded with a recording device 125 via the recording device interface 124 during the knowledge transfer session. At step 415, the optical tracking interface 128 receives code tracking indicators from an optical tracking device 129 operated by a user of at the first terminal 120 when the optical tracking device 129 is focused on the segment, line, or module of source code.

Continuing in FIG. 3B, at step 420 the correlation unit 133 determines via the code tracking indicators a module of the segment of code under review. At step 425, the correlation unit 133 associates portions of the recorded audio with the determined module to generate audiovisual source code documentation. The audiovisual source code documentation remains available in the audiovisual documentation module 167 of knowledge transfer server 160 for later viewing. At step 430, (in the near or distant future) upon request from the user, the playback unit 135 plays back the audiovisual source code documentation with a playback device 136 while displaying the correlated source code module in the integrated development environment 121. At step 435, the knowledge transfer session is terminated.

FIG. 4 depicts a block diagram of components of first terminal 120, second terminal 140, and knowledge transfer server 160, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

First terminal 120, second terminal 140, and knowledge transfer server 160 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for audiovisual source code documentation, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

First terminal 120, second terminal 140, and knowledge transfer server 160 may also include a R/W drive or interface 914 to read from and write to one or more portable computer readable storage media 926. Application programs 911 on computing device 106 may be stored on one or more of the portable computer readable storage media 926, read via the respective R/W drive or interface 914 and loaded into the respective computer readable storage media 908.

First terminal 120, second terminal 140, and knowledge transfer server 160 may also include a network adapter or interface 916, such as a TCP/IP adapter card or wireless communication adapter (such as a 4G wireless communication adapter using OFDMA technology). Application programs 911 on first terminal 120, second terminal 140, and knowledge transfer server 160 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

First terminal 120, second terminal 140, and knowledge transfer server 160 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
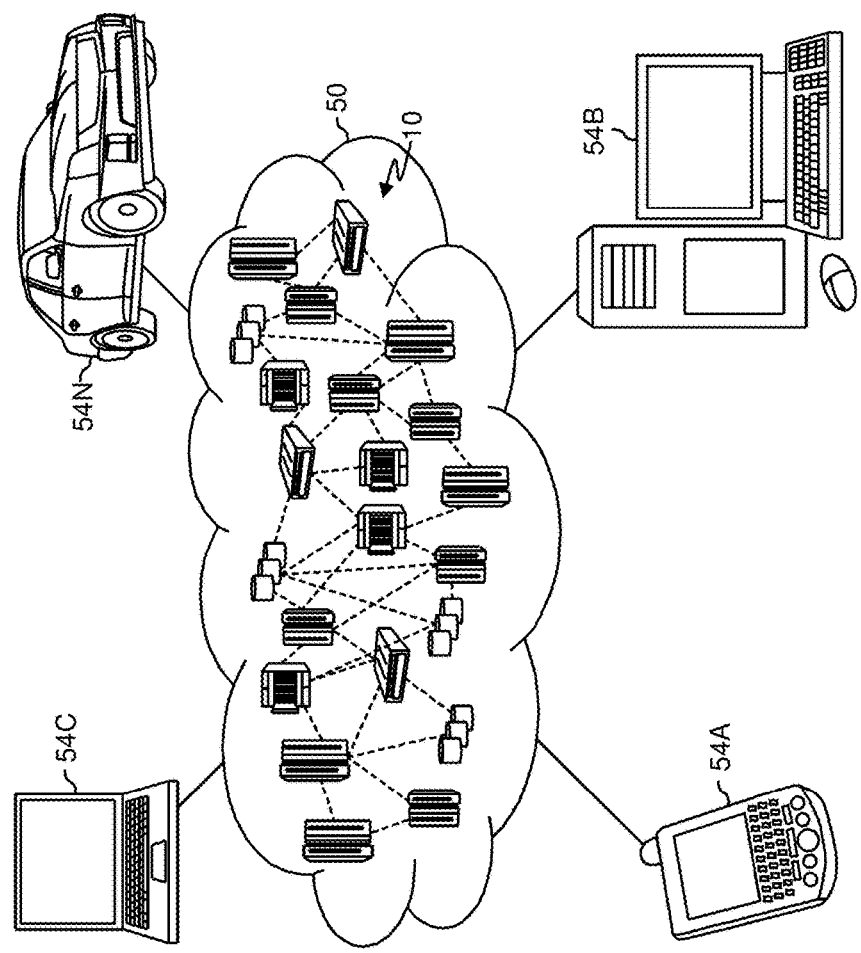
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
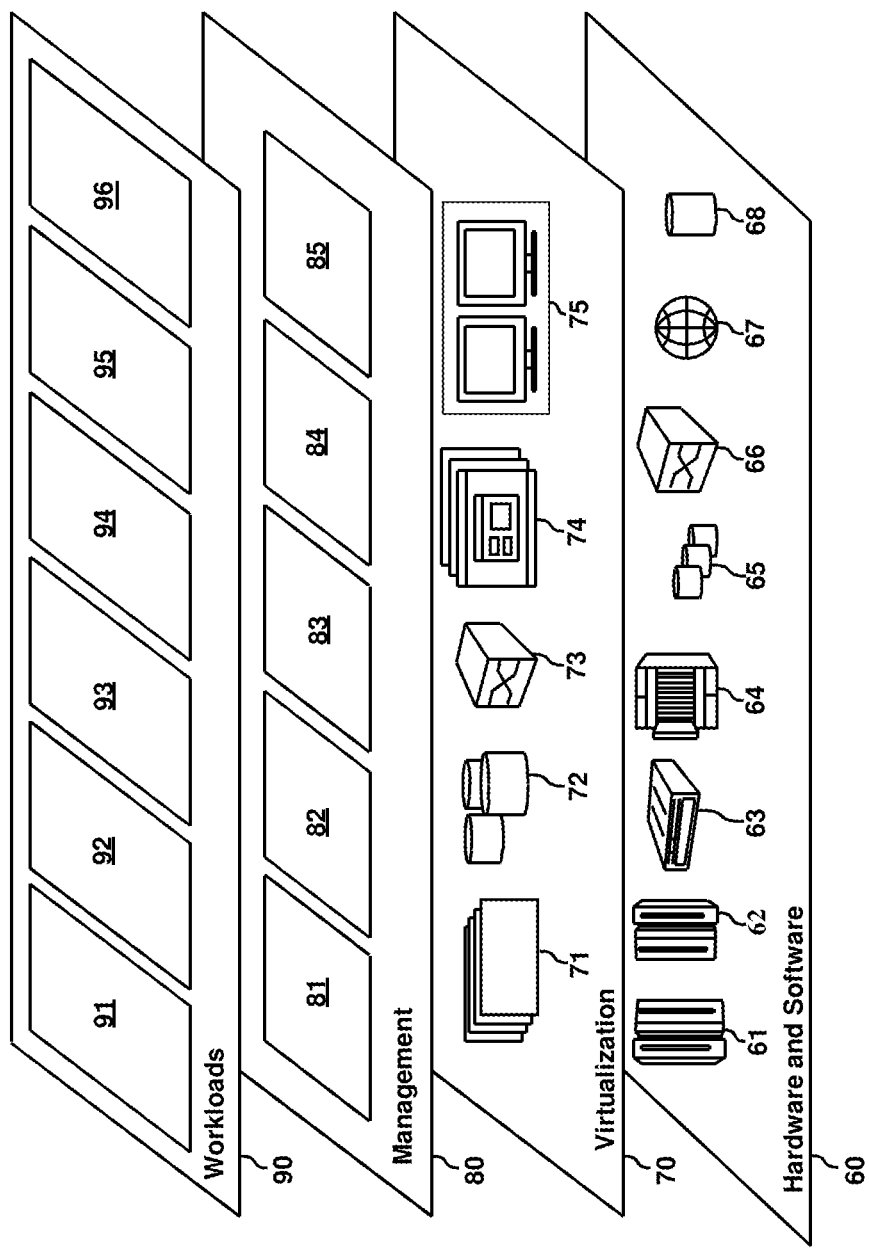
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment 100 for audiovisual source code documentation.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of audiovisually documenting source code in an integrated development environment, the method comprising:

initiating by a computing device associated with a first terminal, a knowledge transfer session for discussion of source code and generation of audiovisual source code documentation explaining segments of source code from a code base;

displaying within an integrated development environment executing on the first terminal an audiovisual interface containing a segment of code from the code base;

recording audio with a recording device during the knowledge transfer session;

receiving code tracking indicators and off-code tracking indicators from an optical tracking device operated by a user at the first terminal when the user is reviewing and visually focused on the segment of code and when the user is reviewing and visually focused away from the segment of code, respectively;

determining by the computing device via the code tracking indicators a module of the segment of code visually under review;

determining portions of the recorded audio corresponding to the code tracking indicators when the user is reviewing and visually focused on the segment of code;

determining further portions of the recorded audio corresponding to the off-code tracking indicators between when the user was and has returned to reviewing and being visually focused on the segment of code;

associating the portions and the further portions of the recorded audio with the determined module of the segment of code to generate audiovisual source code documentation; and terminating the knowledge transfer session.

2. The method of claim 1, further comprising in response to request, playing back by the computing device the audiovisual source code documentation while displaying the determined module in the integrated development environment.

3. The method of claim 1, wherein the audiovisual interface is visible on the first terminal.

4. The method of claim 1, wherein the code tracking indicators are screen coordinates of a screen coordinate system and when determining the module of the segment of code under review, the computing device utilizes the screen coordinates to determine a line number or line numbers of code under review, and the computing device utilizes the line number or line numbers to determine with the integrated development environment the module of the segment of code under review.

5. The method of claim 1, wherein the audiovisual interface is a plug-in to the integrated development environment.

6. The method of claim 1, wherein the received code tracking indicators from the optical tracking device are captured using an eye gaze tracking algorithm.

7. The method of claim 1, wherein the portions of the recorded audio are associated with traditional source code documentation for the code base.

8. The method of claim 7, wherein after terminating the knowledge transfer session the computing device transcribes the recorded audio using a speech-to-text service and associates the transcribed audio with the traditional source code documentation for the code base.

9. The method of claim 1, further comprising:

receiving off-code tracking indicators from the optical tracking device when not focused on any segment of code;

determining a start time of off-code tracking;

determining an end time of off-code tracking;

analyzing recorded audio between the start time of off-code tracking and the end time of off-code tracking and determining modules discussed in the recorded audio; and associating portions of the recorded audio between the start time of off-code tracking and the end time of off-code tracking with the determined modules.

10. A computer program product using a computing device to audiovisually document source code in an integrated development environment, the computer program product comprising:

one or more non-transitory computer-readable storage media and program instructions stored on the one or more non-transitory computer-readable storage media, the program instructions configured to be executed by the computing device that causes the computing device to perform a method comprising:

initiating by a computing device associated with a first terminal, a knowledge transfer session for discussion of source code and generation of audiovisual source code documentation explaining segments of source code from a code base;

displaying within an integrated development environment executing on the first terminal an audiovisual interface containing a segment of code from the code base;

recording audio with a recording device during the knowledge transfer session;

receiving code tracking indicators and off-code tracking indicators from an optical tracking device operated by a user at the first terminal when the user is reviewing and visually focused on the segment of code and when the user is reviewing and visually focused away from the segment of code, respectively;

determining via the code tracking indicators a module of the segment of code visually under review;

determining portions of the recorded audio corresponding to the code tracking indicators when the user is reviewing and visually focused on the segment of code;

determining further portions of the recorded audio corresponding to the off-code tracking indicators between when the user was and has returned to reviewing and being visually focused on the segment of code;

associating the portions and the further portions of the recorded audio with the determined module of the segment of code to generate audiovisual source code documentation; and terminating the knowledge transfer session.

11. The computer program product of claim 10, wherein the method performed by the computing device further comprises in response to request, playing back by the computing device the audiovisual source code documentation while displaying the determined module in the integrated development environment.

12. The computer program product of claim 10, wherein the audiovisual interface is visible on the first terminal.

13. The computer program product of claim 10, wherein the code tracking indicators are screen coordinates of a screen coordinate system and when determining the module of the segment of code under review, the computing device utilizes the screen coordinates to determine a line number or line numbers of code under review, and the computing device utilizes the line number or line numbers to determine with the integrated development environment the module of the segment of code under review.

14. The computer program product of claim 10, wherein the audiovisual interface is a plug-in to the integrated development environment.

15. The computer program product of claim 10, wherein the received code tracking indicators from the optical tracking device are captured using an eye gaze tracking algorithm.

16. The computer program product of claim 10, wherein the portions of the recorded audio are associated with traditional source code documentation for the code base.

17. The computer program product of claim 16, wherein computing device after terminating the knowledge transfer session the computing device transcribes the recorded audio using a speech-to-text service and associates the transcribed audio with the traditional source code documentation for the code base.

18. The computer program product of claim 10, wherein the method performed by the computing device further comprises:
   receiving off-code tracking indicators from the optical tracking device when not focused on any segment of code;
   determining a start time of off-code tracking;
   determining an end time of off-code tracking;
   analyzing recorded audio between the start time of off-code tracking and the end time of off-code tracking and determining modules discussed in the recorded audio; and
   associating portions of the recorded audio between the start time of off-code tracking and the end time of off-code tracking with the determined modules.

19. A computer system audiovisually documenting source code in an integrated development environment, the computer system comprising:
   one or more computer processors;
   one or more computer-readable storage media;
   program instructions stored on the computer-readable storage media configured to be executed by at least one of the one or more processors, the program instructions comprising:
      initiating by a computing device associated with a first terminal, a knowledge transfer session for discussion of source code and generation of audiovisual source code documentation explaining segments of source code from a code base;
      displaying within an integrated development environment executing on the first terminal an audiovisual interface containing a segment of code from the code base;
      recording audio with a recording device during the knowledge transfer session;
      receiving code tracking indicators and off-code tracking indicators from an optical tracking device operated by a user at the first terminal when the user is reviewing and visually focused on the segment of code and when the user is reviewing and visually focused away from the segment of code, respectively;
      determining via the code tracking indicators a module of the segment of code visually under review;
      determining portions of the recorded audio corresponding to the code tracking indicators when the user is reviewing and visually focused on the segment of code;
      determining further portions of the recorded audio corresponding to the off-code tracking indicators between when the user was and has returned to reviewing and being visually focused on the segment of code;
      associating the portions and the further portions of the recorded audio with the determined module of the segment of code to generate audiovisual source code documentation; and
      terminating the knowledge transfer session.

20. The computer system of claim 19, wherein the program instructions further comprise, in response to request, playing back by the computing device the audiovisual source code documentation while displaying the determined module in the integrated development environment.

* * * * *